US008966179B1

(12) United States Patent
Wang et al.

(10) Patent No.: US 8,966,179 B1
(45) Date of Patent: Feb. 24, 2015

(54) VOLATILE MEMORY STORAGE FOR PRIVATE WEB BROWSING

(71) Applicant: Google Inc., Mountain View, CA (US)

(72) Inventors: Meng Wang, San Francisco, CA (US); Arnaud Claude Weber, Saratoga, CA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/758,970

(22) Filed: Feb. 4, 2013

Related U.S. Application Data

(60) Provisional application No. 61/699,175, filed on Sep. 10, 2012.

(51) Int. Cl.
*G06F 12/02* (2006.01)
*G06F 17/30* (2006.01)

(52) U.S. Cl.
CPC .................. *G06F 17/30876* (2013.01)
USPC ........... 711/118; 711/104; 711/105; 711/156; 711/170; 707/721; 707/768; 709/247; 709/228

(58) Field of Classification Search
USPC .......... 711/118, 104, 105, 156, 170; 709/247, 709/228; 707/721, 768
See application file for complete search history.

(56) References Cited

U.S. PATENT DOCUMENTS

| | | | |
|---|---|---|---|
| 6,542,992 B1 * | 4/2003 | Peirce et al. ................... 713/153 |
| 6,601,169 B2 | 7/2003 | Wallace, Jr. et al. |
| 6,825,489 B2 * | 11/2004 | Kozicki ........................... 257/42 |
| 6,912,522 B2 * | 6/2005 | Edgar .................................... 1/1 |
| 6,944,651 B2 | 9/2005 | Onyon et al. |
| 7,257,612 B2 * | 8/2007 | Humenansky et al. ........ 709/201 |
| 7,299,500 B1 | 11/2007 | Klebe et al. |
| 7,565,674 B2 * | 7/2009 | Motoe et al. ..................... 725/81 |
| 7,584,244 B2 * | 9/2009 | Forstadius ..................... 709/203 |
| 7,779,282 B2 * | 8/2010 | Ramachandran et al. .... 713/323 |
| 7,870,380 B2 * | 1/2011 | VanHeyningen et al. ..... 713/151 |
| 7,979,909 B2 | 7/2011 | Jancula et al. |
| 8,042,138 B2 * | 10/2011 | Pack et al. ......................... 725/52 |
| 8,095,967 B2 | 1/2012 | Loesch et al. |
| 8,209,411 B2 * | 6/2012 | Forstadius ..................... 709/223 |

(Continued)

OTHER PUBLICATIONS

Aggarwal et al., "An Analysis of Private Browsing Modes in Modern Browsers", retrieved from <http://crypto.stanford.edu/.about.dabo/pubs/papers/privatebrowsing.pd-f>, Dec. 6, 2011, pp. 1-15.

(Continued)

*Primary Examiner* — Stephen Elmore
(74) *Attorney, Agent, or Firm* — McDermott Will & Emery LLP

(57) ABSTRACT

Computer-implemented methods for temporarily storing history of a web browsing session are provided. In one aspect, the method includes receiving a request to temporarily store session information for a web browsing session comprising at least one request to view a web page. The method also includes compressing data for the session information associated with the web browsing session, and storing the compressed data for the session information associated with the web browsing session only in a volatile memory. The compressed data for the session information stored in the volatile memory is lost when power to the volatile memory is off. A reference to the compressed data for the session information in the volatile memory is removed when the web browsing session is terminated.

20 Claims, 5 Drawing Sheets

(56) References Cited

U.S. PATENT DOCUMENTS

| | | | |
|---|---|---|---|
| 8,316,460 B1 | 11/2012 | Wang et al. | |
| 8,499,324 B1* | 7/2013 | Mitchell et al. | 725/76 |
| 8,533,457 B2* | 9/2013 | Vanheyningen et al. | 713/153 |
| 8,572,218 B2* | 10/2013 | Narayanan et al. | 709/220 |
| 8,576,440 B2* | 11/2013 | Sakiyama et al. | 358/1.9 |
| 8,793,389 B2* | 7/2014 | Lindner et al. | 709/228 |
| 8,832,746 B2* | 9/2014 | Pack et al. | 725/52 |
| 2002/0152378 A1 | 10/2002 | Wallace et al. | |
| 2003/0035315 A1* | 2/2003 | Kozicki | 365/171 |
| 2004/0068648 A1* | 4/2004 | Lewis et al. | 713/153 |
| 2004/0165527 A1* | 8/2004 | Gu et al. | 370/229 |
| 2004/0215665 A1* | 10/2004 | Edgar et al. | 707/200 |
| 2005/0066040 A1* | 3/2005 | Borella et al. | 709/228 |
| 2006/0133333 A1* | 6/2006 | Alex et al. | 370/338 |
| 2007/0143130 A1* | 6/2007 | Hearn | 705/1 |
| 2007/0220008 A1* | 9/2007 | Mizhar et al. | 707/10 |
| 2008/0052641 A1 | 2/2008 | Brown et al. | |
| 2008/0098129 A1* | 4/2008 | Niddam et al. | 709/247 |
| 2008/0162682 A1* | 7/2008 | Ramachandran et al. | 709/223 |
| 2009/0144546 A1 | 6/2009 | Jancula et al. | |
| 2009/0158035 A1 | 6/2009 | Stultz | |
| 2010/0017616 A1 | 1/2010 | Nichols et al. | |
| 2010/0131441 A1 | 5/2010 | Gruenhagen et al. | |
| 2010/0241863 A1* | 9/2010 | Giraud et al. | 713/176 |
| 2011/0145313 A1* | 6/2011 | Narayanan et al. | 709/203 |
| 2011/0167492 A1 | 7/2011 | Ghosh et al. | |
| 2011/0238992 A1 | 9/2011 | Jancula et al. | |
| 2011/0282742 A1 | 11/2011 | Umeda | |
| 2013/0159539 A1* | 6/2013 | Lindner et al. | 709/228 |

OTHER PUBLICATIONS

Martinez-Balleste et al., "Privacy in the Information and Communication Technologies," 2007, IEEE, pp. 775-780.

Mohania et al., "Secured Web Access," 2001, IEEE, pp. 182-189.

Ohta et al., "Design and Implementation of Privacy-Enhanced Operation History Middleware for Smartphones," 2011, IEEE, pp. 336-341.

P Smulikowski, "First Look at the Windows 7 Forensics," 2009, University of Strathclyde, pp. 11-52.

Spiekermann et al., "Engineering Privacy," 2009, IEEE, pp. 67-82.

* cited by examiner

VOLATILE MEMORY STORAGE FOR PRIVATE WEB BROWSING

CROSS-REFERENCES TO RELATED APPLICATIONS

The present application claims the benefit of U.S. Provisional Patent Application No. 61/699,175, entitled "Volatile Memory Storage for Private Web Browsing," filed on Sep. 10, 2012, which is hereby incorporated by reference in its entirety for all purposes.

BACKGROUND

The present disclosure generally relates to browsing web content from a user device, and more particularly to storing information related to the browsing session in volatile memory.

Browsers on mobile devices typically store the history of user browsing sessions in memory. A user that does not desire to leave a record of a web browsing session must actively trigger the history of the web browsing session to be deleted. If the user forgets to trigger the deletion, the history can be retrieved from memory by another user. In certain circumstances, even after deletion, traces of the web browsing session can be retrieved from memory.

SUMMARY

According to one embodiment of the present disclosure, a computer-implemented method for temporarily storing history of a web browsing session is provided. The method includes receiving a request to temporarily store session information for a web browsing session comprising at least one request to view a web page. The method also includes compressing data for the session information associated with the web browsing session, and storing the compressed data for the session information associated with the web browsing session only in a volatile memory. The compressed data for the session information stored in the volatile memory is lost when power to the volatile memory is off. A reference to the compressed data for the session information in the volatile memory is removed when the web browsing session is terminated.

According to another embodiment of the present disclosure, a machine-readable storage medium including machine-readable instructions for causing a processor to execute a method for temporarily storing history of a web browsing session is provided. The method includes receiving a request to temporarily store session information for a web browsing session comprising at least one request to view a web page. The method also includes determining an amount of memory space in volatile memory required by the request to view the web page, and determining an amount of free memory space remaining in the volatile memory. When the amount of memory space required by the request to view the web page exceeds the amount of free memory space remaining in the volatile memory, data for the session information related to the request to view the web page is compressed before being stored in the volatile memory. The compressed data for the session information is stored only in the volatile memory. The compressed data stored in the volatile memory is lost when power to the volatile memory is off.

According to a further embodiment of the present disclosure, a system for temporarily storing history of a private web browsing session is provided. The system includes a volatile memory that includes session information. The system further includes a processor. The processor is configured to receive a request to temporarily store session information for a web browsing session including at least one request to view a web page, and to store the session information associated with the web browsing session only in the volatile memory. All information stored in the volatile memory is lost when power to the volatile memory is off. The processor is also configured to delete the session information from the volatile memory when the web browsing session is terminated by a user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
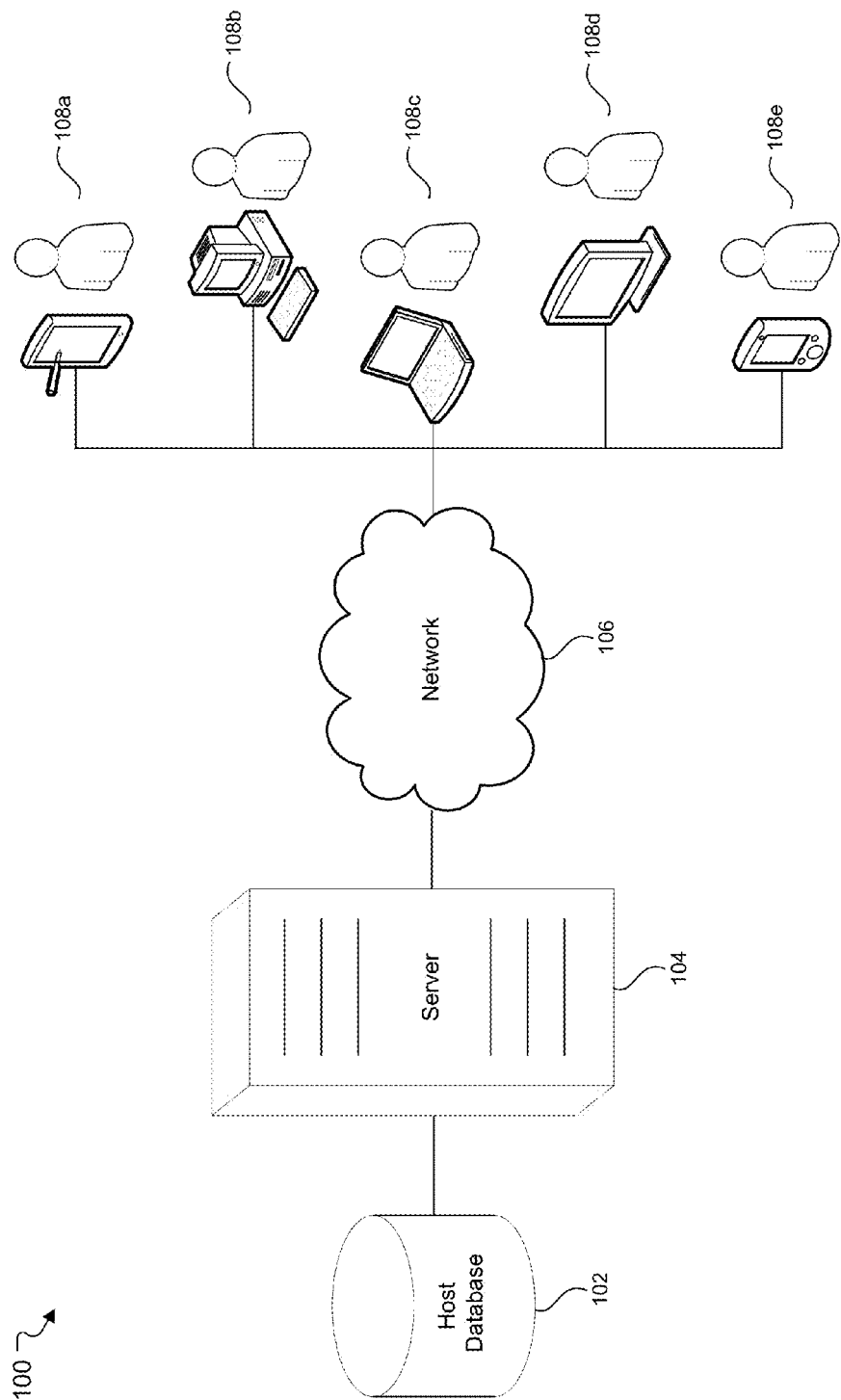
FIG. 1 illustrates an exemplary architecture for storing browsing session information of a private web browsing session in volatile memory.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

According to one embodiment of the present disclosure, a computer-implemented method for temporarily storing history of a web browsing session is provided. The method includes receiving a request to temporarily store session information for a web browsing session comprising at least one request to view a web page. The method also includes compressing data for the session information associated with the web browsing session, and storing the compressed data for the session information associated with the web browsing session only in a volatile memory. The compressed data for the session information stored in the volatile memory is lost when power to the volatile memory is off. A reference to the compressed data for the session information in the volatile memory is removed when the web browsing session is terminated.

The disclosed mobile web browser compresses data for the session information associated with the web browsing session, and stores the compressed data for the session information of a private mobile web browsing session in volatile memory. Temporarily storing the compressed data for the session information in volatile memory ensures that a history of the web browsing session becomes inaccessible once a user closes the web browsing session as the corresponding session information is erased. If the web browsing session ends unexpectedly (e.g., it stops performing as expected), the session information will also be automatically lost (as a function of it being in volatile memory) and the compressed data for the corresponding session information will remain inaccessible.

Although many examples provided herein describe a user's information (e.g., web browsing information) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

FIG. 1 illustrates an exemplary architecture 100 for storing browsing session information of a private web browsing session in volatile memory. The architecture 100 includes servers 104 and clients 108a-108e connected over a network 106.

Each of the clients 108a-108e is configured to download, install, and run a web browser as disclosed herein. The web browser is configured to run on clients 108a-108e that are mobile or non-mobile. The clients 108a-108e can be, for example, desktop computers, laptop computers, handheld computers, televisions with one or more processors attached or coupled thereto, personal digital assistants (PDAs), cellular telephones, network appliances, cameras, smart phones, enhanced general packet radio service (EGPRS) mobile phones, media players, navigation devices, email devices, game consoles, set top boxes, or a combination of any these data processing devices or other data processing devices.

The web browser can be downloaded over the network 106 from one of the many servers 104. For purposes of load balancing, multiple servers 104 can also host the data for downloading the web browser, and the data can be stored in a host database 102. In certain instances, different versions and/or configurations of the web browser that include the features disclosed herein are available for download from a server 104 and subsequent installation depending on whether the client 108a-108e is a mobile device or non-mobile device. The web browser, once installed on a client 108a-108e, is configured to load web pages from any one or multiple client servers 104 hosting the web pages. The servers 104 can be any device having an appropriate processor, memory, and communications capability for hosting the data for installing the web browser and for hosting the web pages.

The network 106 can include, for example, any one or more of a personal area network (PAN), a local area network (LAN), a campus area network (CAN), a metropolitan area network (MAN), a wide area network (WAN), a broadband network (BBN), the Internet, and the like. Further, the network 106 can include, but is not limited to, any one or more of the following network topologies, including a bus network, a star network, a ring network, a mesh network, a star-bus network, tree or hierarchical network, and the like. In some aspects, each client 108a-108e can communicate with servers 104 via a virtual private network (VPN), Secure Shell (SSH) tunnel, or other secure network connection. In some aspects, network 106 may further include a corporate network (e.g., intranet) and one or more wireless access points.

The disclosed web browser, once downloaded from a server 104 and installed and executed on a client 108a-108e, is configured to store browsing session information on a client 108a-108e in non-volatile memory. The disclosed web browser is also configured to store private browsing session information on the client 108a-108e in volatile memory (e.g. random access memory), as opposed to non-volatile memory, where browsing session information is typically stored. While session information stored in non-volatile memory can be made inaccessible to a web browser in certain instances, the session information may nonetheless remain stored in non-volatile (e.g., in a browser cache) and may be recovered via alternative means. Furthermore, information stored in non-volatile memory is maintained even after a client is powered down and restarted. Browsing session information stored in volatile memory, on the other hand, is cleared from the volatile memory when the client on which the volatile memory operates is powered off. Furthermore, browsing session information may be made inaccessible and by actively deleting the information when a web browsing session is terminated (e.g., the web browser is closed by a user). In certain aspects, if the web browser is unexpectedly closed (e.g., due to an error on the client 108a-108e ending or "killing" the web browser as a background process), then the private browsing session information is lost and becomes inaccessible.

In certain other aspects, the user may configure the web browser to survive an unexpected closing. When the user configures the web browser 222 to survive an unexpected closing, the private browsing session information 226 stored in volatile memory 228 is recovered and the web browser 222 is returned to the state it was in before it unexpectedly closed in the event that the web browser 222 is unexpectedly closed.

In certain aspects, data for the private browsing session stored in the volatile memory 228 may be compressed in order to address memory constraints of the volatile memory 228. For example, when the client 108a-108e detects that the amount of available volatile memory is below a predetermined threshold, the system can compress the session information stored in volatile memory 228 to create more room for additional session data.

Figure 2:
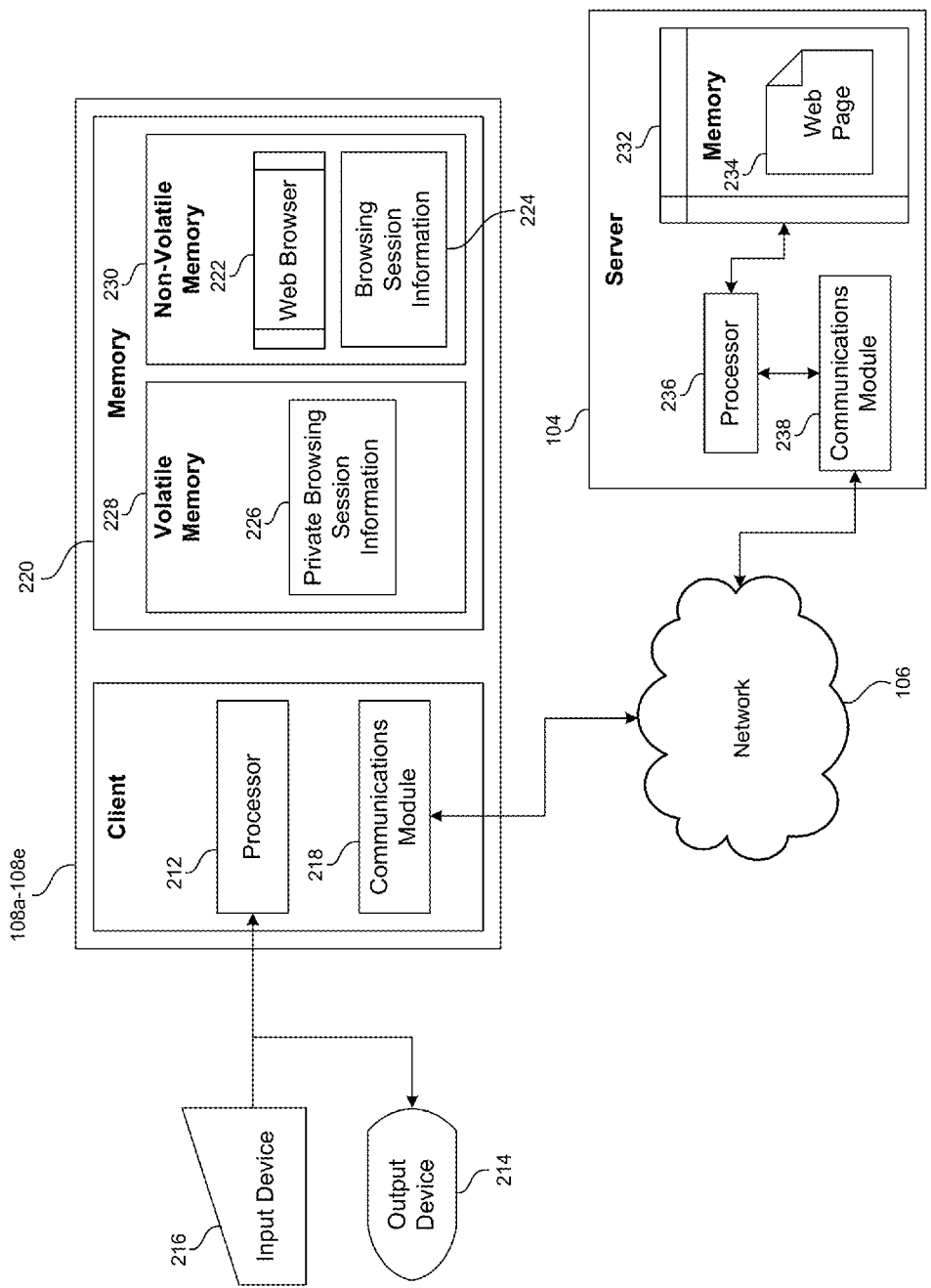
FIG. 2 is a block diagram illustrating the exemplary client and server from the architecture of FIG. 1 according to certain aspects of the disclosure.

FIG. 2 is a block diagram 200 illustrating an exemplary server 104 and client 108a-108e in the architecture 100 of FIG. 1 according to certain aspects of the disclosure. The client 108a-108e and the server 104 are connected over the network 106 via respective communications modules 218 and 238. The communications modules 218 and 238 are configured to interface with the network 106 to send and receive information, such as data, requests, responses, and commands to other devices on the network. The communications modules 218 and 238 can be, for example, modems or Ethernet cards.

The client 108a-108e includes a processor 212, the communications module 218, and a memory 220. The memory 220 is divided into volatile memory 228 (e.g., random access memory) and non-volatile memory 230 (e.g., flash memory, hard drive, etc.). As will be discussed in further detail below, the non-volatile memory 230 includes a web browser 222 and browsing session information 224 from the web browser 222, and the volatile memory 228 includes private browsing session information 226. The client 108a-108e also includes an input device 216, such as a keyboard, touchscreen, or mouse, to receive user requests to the web browser (e.g., to enter a private browsing mode or to download web pages).

The processor 212 of the client 108a-108e is configured to execute instructions, such as instructions physically coded into the processor 212, instructions received from software in memory 240, or a combination of both. For example, the processor 212 of the client 108a-108e executes instructions from the web browser 222 to receive a request to temporarily store browsing session information for a web browsing session (e.g., in the web browser 222). The request can be received from a user during a web browsing session within the web browser 222 by the user selecting, using input device 216, an option to begin a private web browsing session as opposed to a regular web browsing session. During a regular web browsing session, persistently stored browsing session information (e.g., browsing history, images, videos, text, and cookies) for web pages is stored in non-volatile memory 230 as browsing session information 224. On the other hand, during a private web browsing session, browsing history, images, videos and text are stored in volatile memory 230 as private browsing session information 226.

For example, the browsing session information 224 and private browsing session information 226 can include data associated with a web page 234 downloaded to the client 108a-108e from a server 104, and web page navigation history. Specifically, the client 108a-108e sends a request to download the web page 234 from the client's communications module 218, over the network 106, to the communications module 238 of the server 104. The processor 236 of the server 104 provides a copy of the web page 234 from memory 232 to the client 108a-108e in response to the request, and the client 108a-108e stores data associated with the web page 234 as part of the browsing session information 224.

The processor 212 identifies whether the browsing session engaged in by the user is private or non-private. If the processor 212 determines that the user has indicated a private browsing session, then private browsing session information 226 is stored in volatile memory. Conversely, if the browsing session is indicated to be non-private, then browsing session information 224 is stored in non-volatile memory. In certain aspects, the processor 212 will continue to store the browsing session information in the respective memory until the session has ended or until the user has indicated a change in the mode from private to non-private or vice versa.

The processor 212 may separately store the browsing session information 224 in the non-volatile memory 230 for non-private browsing sessions and the private browsing session information 226 in the volatile memory 228 for private browsing sessions. When the browsing session is completed by a user, the browsing session information 224 associated with the non-private browsing may be maintained in the non-volatile memory 230. The private browsing session information 226 is automatically deleted from the non-volatile memory 230 by the processor 212 in order to free up storage space in the non-volatile memory 230 to be reused. If the browsing session ends unexpectedly (e.g., due to an error in the web browser 222 or otherwise on the client 108a-108e), the private browsing session information 226 may also be automatically deleted from the non-volatile memory 230 by the processor 212 such that the private browsing session information 224 stored in the non-volatile memory 228 is not accessible when the web browser 224 is next run on the client 108a-108e.

In certain aspects, the processor 212 may detect the amount of storage space available in the volatile memory 228. When the processor 212 detects that the amount of storage space available in the volatile memory 228 is below a predetermined threshold, the processor 212 can compress the session information stored in the volatile memory 228 to create more room for additional sessions. For example, when the user has multiple web browser sessions running concurrently in the private browsing mode and each session stores private browsing session information in volatile memory 228, the amount of storage space available may fall below the predetermined threshold. Upon detection of this condition, the processor 212 may compress the session information to free up room in the volatile memory 228 for additional private browsing session information to be stored.

Figure 3:
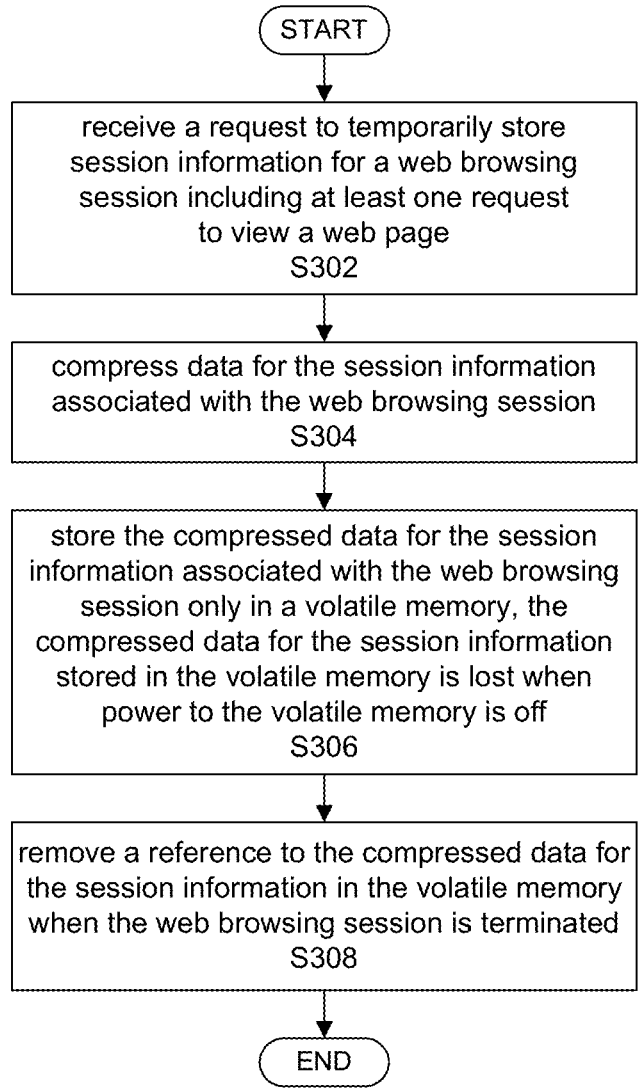
FIG. 3 illustrates an exemplary process for storing browsing session information of a private web browsing session in volatile memory using an exemplary client of FIG. 2.

FIG. 3 illustrates an exemplary process 300 for storing browsing session information of a web browsing session in volatile memory using the exemplary client of FIG. 2. The process 300 begins when an instance of a web browser 222 is run and a request to temporarily store browsing session information for a web browsing session (e.g., in the web browser 222) including at least one request to view a web page 234 is received in S302. In S304 data for the session information associated with the web browsing session is compressed. The compressed data for the session information associated with the web browsing session is stored only in a volatile memory in S306. In some aspects, the session information stored in the volatile memory is lost when power to the volatile memory is off. A reference to the compressed data for the session information in the volatile memory is removed when the web browsing session is terminated in S308.

FIG. 3 set forth an exemplary process 300 for storing browsing session information of a private web browsing session in volatile memory using the exemplary client of FIG. 2. An example will now be described using the exemplary process 300 of FIG. 3 and a smartphone 108e as the exemplary client.

Figure 4A:
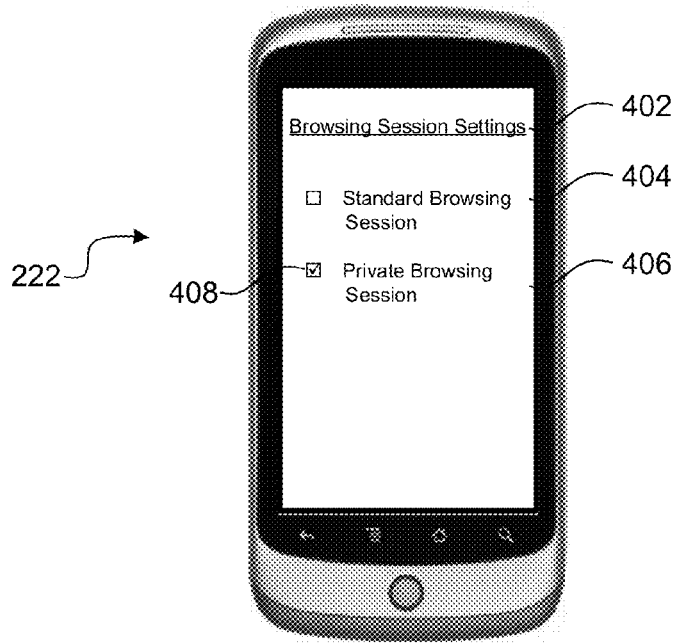
FIGS. 4A and 4B are exemplary screenshots associated with the exemplary process of FIG. 3.

The process 300 begins when a user opens a web browser 222 on the smartphone 108e. The web browser 222 displays a settings interface on an output device 214 in which the user can select between conducting a standard browsing session or a private browsing session. FIG. 4A is an exemplary screenshot 400 of a settings interface 402 in which the user is provided the options of selecting a standard browsing session 404 or a private browsing session 406, and in which the user has selected 408 to conduct a private browsing session.

In S302, a request to temporarily store session information for a web browsing session including at least one request to view a web page 234 during the web browsing session is received from the user. Upon receiving the request to view a web page 234 in the private browsing session, data for the session information associated with the web browsing session is compressed in S304, in order to reduce the amount of space necessary to store the session information data. The compressed data for the session information associated with the web browsing session information is stored only in a volatile memory 228 in S306. That is, all browsing session information such as a history of the web pages 234 visited is temporarily stored in volatile memory 228 during the web browsing session. In some aspects, the compressed data for the session information stored in the volatile memory is lost when power to the volatile memory is off.

Figure 4B:
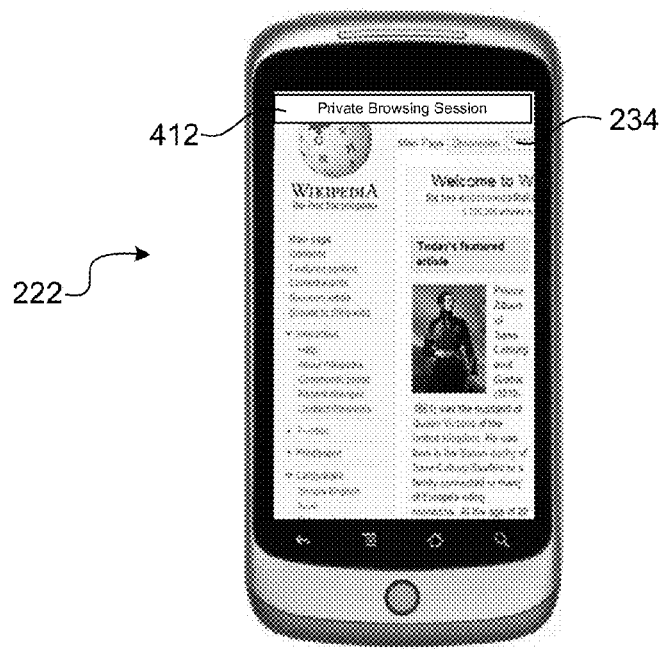

FIG. 4B illustrates an exemplary screenshot 410 of the web page 234 in a web browsing interface in the web browser 222 displayed to the user on the smartphone 108e in the private browsing mode. The web browsing interface includes an indicator 412 that indicates the user is conducting a private browsing session. When the web browsing session is terminated in S308, a reference to the compressed data for the session information in the volatile memory 228 is removed. Once the reference has been removed, the private browsing session information 224 stored in the non-volatile memory 228 will no longer be accessible when a web browser 224 is subsequently run on the smartphone 108e.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
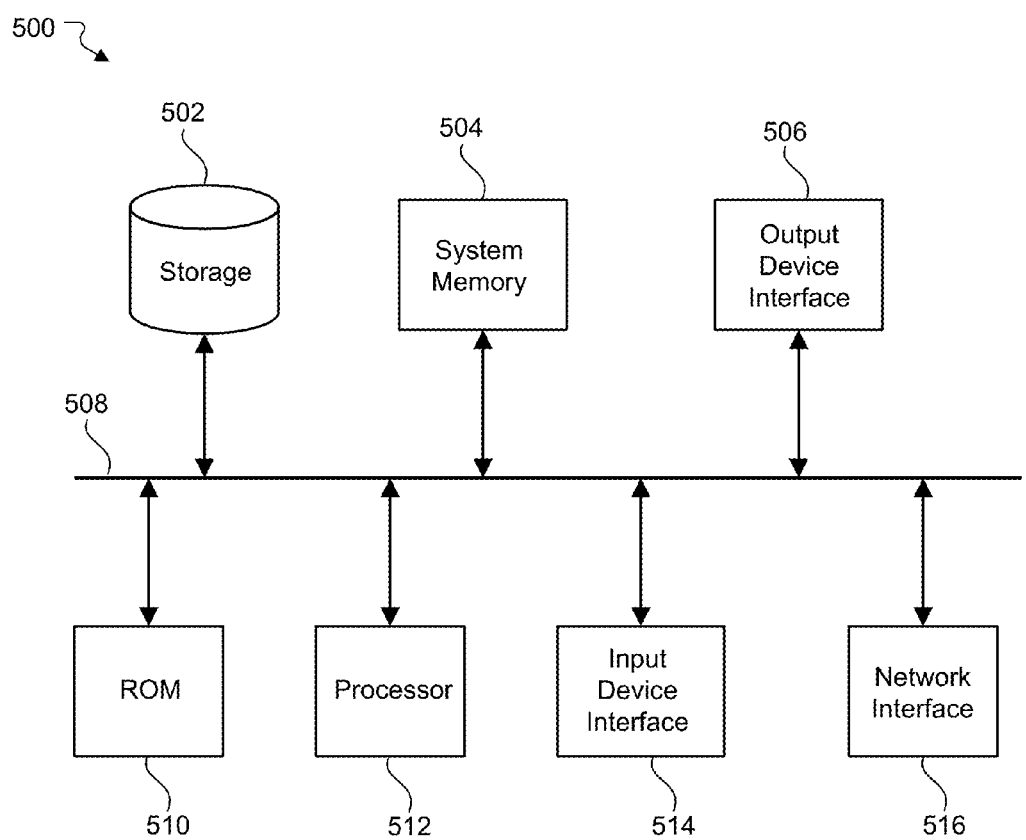
FIG. 5 is a block diagram illustrating an exemplary computer system with which the clients and server of FIG. 2 can be implemented.

FIG. 5 conceptually illustrates an example electronic system 500 with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for storing browsing session information of a private web browsing session in volatile memory in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers, such as a local area network, a wide area network, or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for temporarily storing history of a web browsing session, the method comprising:
   receiving a request to temporarily store session information for a web browsing session comprising at least one request to view a web page;
   compressing data for the session information associated with the web browsing session;
   storing the compressed data for the session information associated with the web browsing session only in a volatile memory, wherein the compressed data for the session information stored in the volatile memory is lost when power to the volatile memory is off; and
   removing a reference to the compressed data for the session information in the volatile memory when the web browsing session is terminated.

2. The computer-implemented method of claim 1, wherein the volatile memory is random access memory (RAM).

3. The computer-implemented method of claim 1, wherein storing the compressed data for the session information only in the volatile memory is in response to receiving the request to temporarily store the session information.

4. The computer-implemented method of claim 1, further comprising deleting the compressed data for the session information from the volatile memory when the web browsing session is terminated by a user.

5. The computer-implemented method of claim 1, wherein the temporarily stored compressed data for the session information for the web page is stored separately from persistently stored session information for another web page.

6. The computer-implemented method of claim 5, wherein the persistently stored session information is stored in a non-volatile memory.

7. The computer-implemented method of claim 1, wherein the request to temporarily store the session information is received from a user.

8. The computer-implemented method of claim 1, wherein compressing data for the session information associated with the web browsing session comprises:
   determining an amount of free memory space remaining in the volatile memory; and
   compressing data for the session information stored in the volatile memory when the amount of free memory space remaining in the volatile memory is below a predetermined threshold.

9. The computer-implemented method of claim 1, further comprising deleting the compressed data for the session information in the volatile memory when the web browsing session is unexpectedly terminated.

10. A machine-readable medium comprising instructions stored therein, which when executed by a system, cause the system to perform operations comprising:
    receiving a request to temporarily store session information for a web browsing session comprising at least one request to view a web page;
    determining an amount of memory space in volatile memory required by the request to view the web page;
    determining an amount of free memory space remaining in the volatile memory;
    compressing data for the session information related to the request to view the web page before storing the data in the volatile memory when the amount of memory space required by the request to view the web page exceeds the amount of free memory space remaining in the volatile memory; and
    storing the compressed data for the session information only in the volatile memory, wherein the compressed data stored in the volatile memory is lost when power to the volatile memory is off.

11. The machine-readable medium of claim 10, further comprising instructions for removing a reference to the compressed data for the session information in the volatile memory when the web browsing session is terminated.

12. The machine-readable medium of claim 11, wherein storing the compressed data for the session information only in the volatile memory is in response to receiving the request to temporarily store the session information.

13. The machine-readable medium of claim 10, wherein the volatile memory is random access memory (RAM).

14. The machine-readable medium of claim 10, further comprising deleting the compressed data for the session information from the volatile memory when the web browsing session is terminated by a user.

15. The machine-readable medium of claim 10, wherein the temporarily stored compressed data for the session information for the web page is stored separately from persistently stored session information for another web page, and wherein the persistently stored session information is stored in a non-volatile memory.

16. The machine-readable medium of claim 10, further comprising instructions for deleting the compressed data for the session information in the volatile memory when the web browsing session is unexpectedly terminated.

17. A system for temporarily storing history of a private web browsing session using encryption, the system comprising:
    a volatile memory comprising session information; and
    a processor configured to:
        receive a request to temporarily store session information for a web browsing session comprising at least one request to view a web page;
        compress data for the session information associated with the web browsing session;
        store the compressed data for the session information associated with the web browsing session only in the volatile memory, wherein all information stored in the volatile memory is lost when power to the volatile memory is off; and
        delete the compressed data for the session information from the volatile memory when the web browsing session is terminated by a user.

18. The system of claim 17, wherein the volatile memory comprising compressed data for the session information is random access memory (RAM).

19. The system of claim 17, wherein the processor is configured to store the compressed data for the session information associated with the web browsing session only in the volatile memory in response to receiving the request to temporarily store the session information.

20. The system of claim 17, wherein the processor is further configured to remove a reference to the compressed data for the session information in the volatile memory when the web browsing session is terminated by the user.

* * * * *